United States Patent [19]

Nakada

[11] Patent Number: 5,388,627
[45] Date of Patent: Feb. 14, 1995

[54] PNEUMATIC TIRE INCLUDING A PROTECTIVE RUBBER LAYER ON THE OUTER SURFACE OF THE SIDEWALLS

[75] Inventor: Yoko Nakada, Hyogo, Japan

[73] Assignee: Sumitomo Rubber Industries, Ltd., Hyogo, Japan

[21] Appl. No.: 998,747

[22] Filed: Dec. 30, 1992

[30] Foreign Application Priority Data

Jan. 10, 1992 [JP] Japan .................. 4-022147

[51] Int. Cl.⁶ .................. B06C 13/02; B06C 13/04
[52] U.S. Cl. .................. 152/454; 152/458; 152/523; 152/524; 152/525; 152/555
[58] Field of Search .................. 152/523–525, 152/454, 458, 555

[56] References Cited

U.S. PATENT DOCUMENTS

| | | | |
|---|---|---|---|
| 3,077,915 | 2/1963 | Weber | 152/458 |
| 3,841,373 | 10/1974 | Gilreath | 152/525 |

FOREIGN PATENT DOCUMENTS

| | | | |
|---|---|---|---|
| 117904 | 9/1984 | European Pat. Off. | |
| 54-132907 | 10/1979 | Japan | 152/525 |
| 61-16113 | 1/1986 | Japan | 152/523 |
| 2-57410 | 2/1990 | Japan . | |
| 2-162101 | 6/1990 | Japan | 152/525 |
| 4-260803 | 9/1992 | Japan | 152/523 |
| 320721 | 10/1929 | United Kingdom | 152/454 |

OTHER PUBLICATIONS

Translation of Japanese Publication 4-260803.
Translation of Japanese Publication 2-162101.
Patent Abstracts of Japan, vol. 005, No. 025 (M-055) 14 Feb. 1981 & JP-A-55 152 605.
Patent Abstracts of Japan, vol. 014, No. 228 (M-0973) 15 May 1990 & JP-A-20 57 410.

*Primary Examiner*—Caleb Weston
*Assistant Examiner*—Adrienne L. Johnstone

[57] ABSTRACT

A pneumatic tire having a tread rubber layer disposed radially outside a carcass, a sidewall rubber layer disposed axially outside the carcass in each sidewall portion, the sidewall rubber layer softer than the tread rubber layer, a protective rubber layer disposed on the outer surface of the sidewall rubber layer, the protective rubber layer made of a fiber-reinforced rubber composition contains 10 to 50 parts by weight of short fibrous reinforcements, 20 to 70 parts by weight of carbon black, and 100 parts by weight of rubber base consisting of 20 to 100 parts by weight of natural rubber or isoprene rubber and 80 to 0 parts by weight of butadiene rubber, the short fibrous reinforcements oriented in the tire circumferential direction.

9 Claims, 4 Drawing Sheets

PNEUMATIC TIRE INCLUDING A PROTECTIVE RUBBER LAYER ON THE OUTER SURFACE OF THE SIDEWALLS

BACKGROUND OF THE INVENTION

The present invention relates to a pneumatic tire having sidewall portions with improved cut resistance and reduced tire weight.

When a vehicle, especially a passenger car, runs against the sidewalk, the tire sidewall bumps against the edge of a stone or concrete structure. As a result, the sidewall is often broken resulting in a puncture, or other damage that shortens the tire's life.

In order to provide a tire sidewall more cut resistant, the thickness of sidewall rubber is increased. However as a result, ride comfort deteriorates, the tire's weight increases and steering performance is lowered. Further, if the hardness of the rubber used to make the sidewall is increased, ride comfort deteriorates, and the sidewall become susceptible to cracking.

SUMMARY OF THE INVENTION

It is therefore, an object of the present invention to provide a pneumatic tire having sidewall portions with improved cut resistance without sacrificing ride comfort and also without increasing tire weight.

According to one aspect of the present invention, a pneumatic tire comprises a tread portion with a pair of edges, a pair of axially spaced bead portions each a bead core, a pair of sidewall portions extending from the edges of the tread portion to the bead portions, a carcass extending between the bead portions, a tread rubber layer disposed radially outside the carcass to define the tread portion, a sidewall rubber layer disposed axially outside the carcass in each sidewall portion, the sidewall rubber layer being softer than the tread rubber layer, and a protective rubber layer disposed on the outer surface of the sidewall rubber layer. The protective rubber layer being made of a fiber-reinforced rubber composition containing 10 to 50 parts by weight of short fibrous reinforcements, 20 to 70 parts by weight of carbon black, and 100 parts by weight of rubber base consisting of 20 to 100 parts by weight of natural rubber (NR) or isoprene rubber (IR) and 80 to 0 parts by weight of butadiene rubber (BR), the short fibrous reinforcements oriented in the tire circumferential direction.

Using the above construction, the protective rubber layer has superior cut resistance due to the short fibrous reinforcements. Since the short fibrous reinforcements are oriented in the tire circumferential direction, the increase in bending rigidity in the radial direction is not so large as to deteriorate ride comfort/or inordinately increase tire weight. Further, by using such a fiber-reinforced rubber composition, the total thickness of the sidewall portion can be decreased without adversely affecting other areas of tire performance.

BRIEF DESCRIPTION OF THE DRAWINGS

An embodiment of the present invention will now be described in detail in conjunction with the accompanying drawings, in which.

DESCRIPTION OF THE PREFERRED EMBODIMENTS

Figure 1:
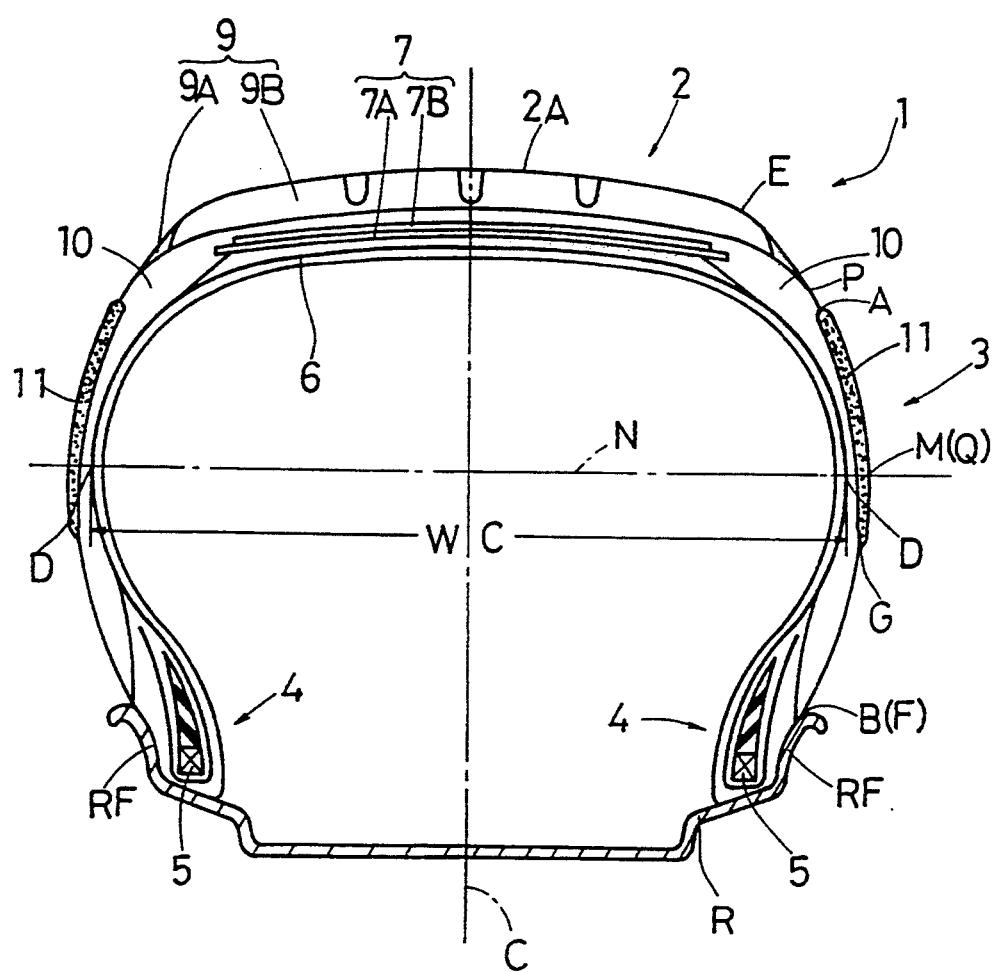
FIG. 1 is a cross sectional view of a tire of the present invention.

In the figures, pneumatic tire 1 has a tread portion 2, a pair of axially spaced bead portions 4, and a pair of sidewall portions 3 extending between the tread edges and the bead portions. One of a pair of bead cores 5 is disposed in each of the bead portions 4. A carcass 6 extends between the bead portions 4 with a belt 7 disposed radially outside the carcass 6 in the tread portion.

FIG. 1 shows the tire 1 in an unloaded state mounted on a regular rim (R) and inflated to a regular pressure.

The carcass 6 includes at least one ply, in this embodiment two plies, of cords arranged radially at an angle of 70 to 90 degrees with respect to the tire equator C and extending between the bead portions, turned up around the bead cores from axially inside to outside for forming two turned up portions and one main portion.

For the carcass cords, organic fiber cords, e.g. nylon, polyester, aromatic polyamide and the like are used.

Each bead portion 4 is provided with a tapered rubber bead apex 8 between the carcass main portion and the turned up portion which extends radially outwardly from the bead core 5.

The belt 7 includes two plies 7A and 7B of parallel cords laid at an angle of 12 to 30 degrees with respect to the tire equator C so that the cords in the radial inner ply 7A cross the cords in the radial outer ply 7B. Organic fiber cords including nylon, polyester, aromatic polyamide and the like and steel cords may be used for the belt cords.

The tread portion 2 is provided radially outside the belt 7 with a tread rubber layer 9. The tread rubber layer 9 in this example consists of a main part 9B extending from one tread edge to the other edge defining a tread surface 2A and a pair of buttress parts 9A each located at the respective edges of the main part 9B.

The JIS A hardness of the tread rubber main part 9B is in the range of 55 to 72, and larger than that of the tread rubber buttress parts 9A.

A sidewall rubber layer 10 is disposed axially outside the carcass 6 in each of the sidewall portions 3. The sidewall rubber layer 10 extends from the tread edge to the bead portion 4 along the outer surface of the carcass 6. The radially outer edge of the sidewall rubber layer 10 is located under the edge of the tread rubber layer 9 and reaches to the belt edge. The radial inner edge thereof is terminated at a position substantially corresponding to the radial outer edge (F) of the flange (RF) of the regular rim (R).

The JIS A hardness of the sidewall rubber layer 10 is in the range of 50 to 65, and smaller than those of the tread rubber main part 9B and the tread rubber buttress parts 9A.

In each sidewall portion 3, a protective rubber layer 11 is disposed axially on the outside surface of the sidewall rubber layer 10.

The protective rubber layer 11 is positioned between two points (P and B), that is, the radial outer edge (A) and the radial inner edge (G) thereof are positioned within the range between the two points (P and B). Here, the point (P) corresponds to the edge of the tread rubber layer 9 on the outer surface of the tire, against the outer surface of the sidewall rubber layer 10. The point (B) corresponds to the point at which the outer surface of the tire starts to contact with the axial inner surface of a flange (RF) of the regular wheel rim (R) when the tire 1 is mounted on the regular wheel rim (R) and inflated to a regular inner pressure but loaded with no tire load.

Preferably, the length of the protective rubber layer 11 measured from the radial outer edge (A) to the radial inner edge (G) therealong is set to be 15 to 70% of the length measured from the point (P) to the point (B) along the outer surface of the sidewall rubber layer 10.

The thickness of the protective rubber layer 11 is in the range of 2 mm to 20 mm. In each sidewall portion 3, a maximum carcass width point (D) is defined as the point on the outer surface of the carcass 6 at which the maximum cross sectional width WC of the carcass 6 lies, and the maximum width point (M) is defined as a point on the outer surface of the tire at the same radial height as the maximum carcass width point (D), and further a maximum tire width point (Q) is defined as a point on the outer surface of the tire at which the maximum cross sectional width of the tire lies.

Preferably, the radial outer edge (A) of the protective rubber layer 11 is terminated radially inward of the point (P) by a distance of about 5 to 15 mm along the surface, whereby the protective rubber layer 11 and the tread rubber layer 9 are not overlapped, thereby exposing the sidewall rubber layer 10.

Figure 2:
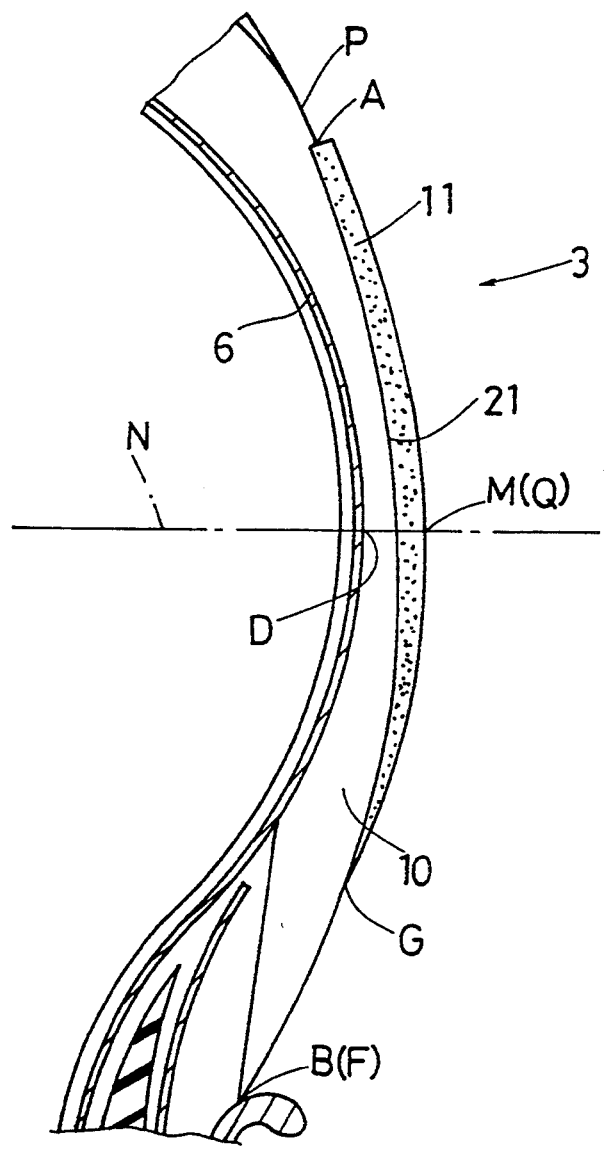
FIG. 2 is an enlarged cross sectional view of one of the sidewall portions thereof.

In FIGS. 1 and 2, the radially inner edge (G) of the protective rubber layer 11 is terminated radially inward of the maximum width point (M), where the three points (D, M and Q) are on a line (N) parallel with the tire axial direction.

Figure 3:
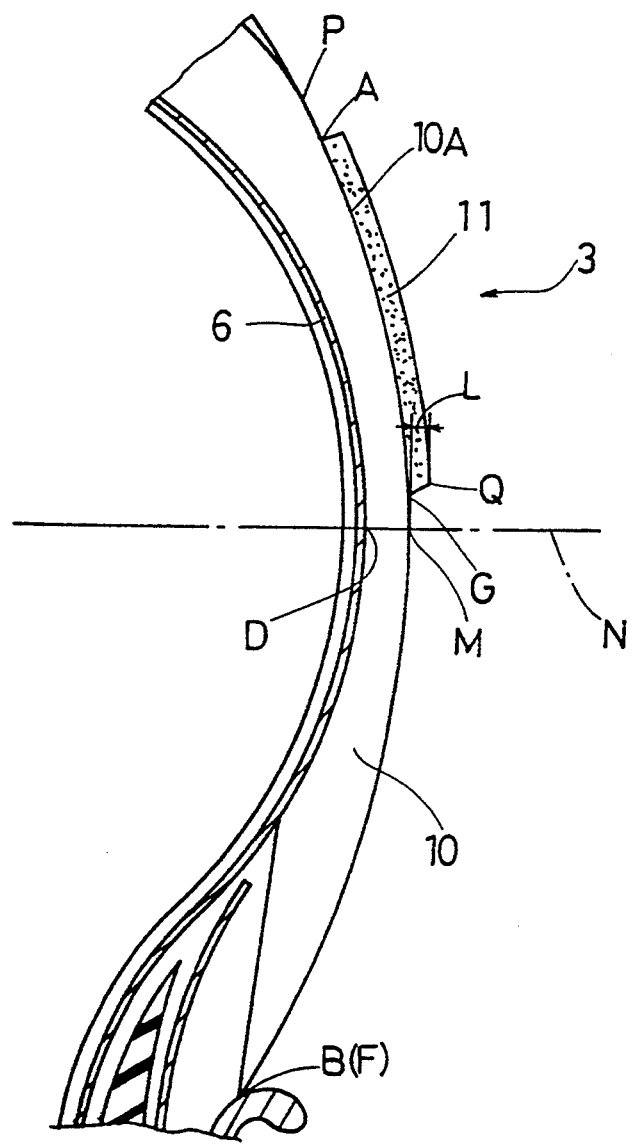
FIG. 3 is a cross sectional view of another example of the sidewall portion.

In FIG. 3, the radial inner edge (G) of the protective rubber layer 11 is terminated radially outward of the maximum width point (M). The maximum tire width point (Q) is positioned at the radially inner edge (G) of the protective rubber layer 11. The amount of the axial protrusion (L) of the point (Q) from the point (M) is set within the range of 2 mm to 10 mm. If (L) is less than 2 mm, the sidewall rubber layer 10 is subject to being cut to if bumped against the edge of a sidewalk or other surface. If (L) exceeds 10 mm, the balance between increased tire weight and sidewall rigidity all is greatly disturbed deteriorating steering stability and ride comfort.

The protective rubber layer 11 can be placed in a recession 21 formed on the outer surface of the sidewall rubber layer 10 as shown FIG. 2. It is also possible to dispose the protective rubber layer 10 on the outer surface 10A of the sidewall rubber layer 10 without the recession as shown in FIG. 3. The protective rubber layer 11 and the sidewall rubber layer 10 are adhered each other by means of vulcanization.

The protective rubber layer 11 is made of a fiber-reinforced rubber composition containing 10 to 50 parts by weight of short fibrous reinforcements, 20 to 70 parts by weight of carbon black, and 100 parts by weight of rubber base consisting of 20 to 100 parts by weight of natural rubber (NR) or isoprene rubber (IR) and 80 to 0 parts by weight of butadiene rubber (BR).

For the short fibrous reinforcements, organic fibers, e.g. nylon fibers, rayon fibers, polyester fibers, aromatic polyamide fibers, glucose fibers, crystalline polybutadiene fibers, cotton fibers, carbon fibers and the like, and inorganic fibers, e.g. metallic fibers or whiskers, glass fibers and the like, can be used.

Preferably, the diameter of the short fibers is in the range of between 1 micron to 0.1 mm and the length thereof is in the range of between 20 microns to 2 mm. The aspect ratio is more than 10. If the diameter and length are lower than the respective ranges, the desired cut resistance is not provided for by the protective rubber layer 11. If they are higher, the fatigue resistance of the protective rubber layer is lowered.

The short fibers are circumferentially oriented at an angle in the range of between 0 to 20 degrees with respect to the circumferential direction.

The protective rubber layer 11 has a complex elastic modulus E* in the range of 50 to 450 kgf/sq.cm., preferably 80 to 400 kgf/sq. cm. If the complex elastic modulus is outside the prescribed range, improved cut resistance and fatigue resistance are not obtained. The complex elastic modulus was measured by a viscoelastic spectrometer of Iwamoto Seisakusyo under a strain amplitude of 2%, a frequency of 10 Hz, and a temperature of 70 degrees C., using a 4 mm width 30 mm length and 2 mm thickness specimen of which the longitudinal direction coincides with the circumferential direction. Therefore, the above-mentioned value of the complex elastic modulus is in the circumferential direction.

If the content of the reinforcements is less than 10 parts by weight, an effective cut resistance cannot be obtained. If the content is more than 50 parts by weight, the rigidity in the radial direction increases to deteriorate the ride comfort and durability, and the workability is greatly lowered.

Figure 4:
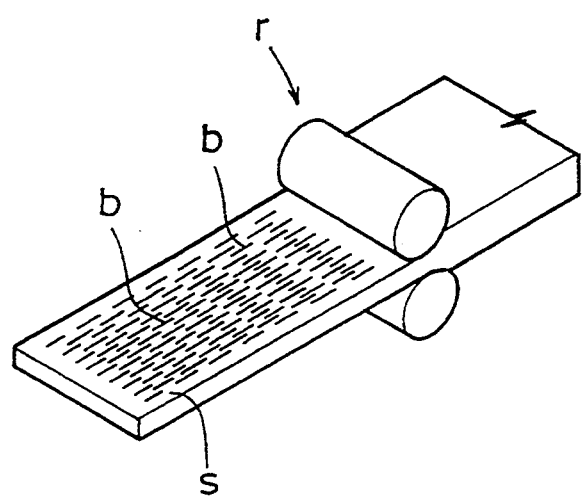
FIG. 4 is a schematic perspective view explaining a method of making a strip of the fiber-reinforced rubber for the protective rubber layer.

A strip (s) of the fiber-reinforced rubber composition in which as shown in FIG. 4 having the short fibers (b) are oriented in the longitudinal direction thereof is formed using a banbury mixer, extruder, calender roller and the like. Thereafter, the strip (s) is applied on the outer surface of the sidewall rubber layer 10, and they are united during tire vulcanization in a tire mold.

Steel radial carcass ply tires were prepared and tested. The internal tire structures were same as FIG. 1 with the exception of the protective rubber layer. The tire size was 155SR15.

Table 1 contains the formulas for the fiber-reinforced rubber compositions (A, B, C) and the non-reinforced rubber composition (D) which used in the test tires, are.

Table 2 contains the results of the edge stone test described below and tire specifications.

In the edge stone test, a tire was provided on the front wheel of a 1500 cc passenger car and designed to impact a 110 mm height concrete edge stone at a speed of 20 km/hr at an approaching angle of 25 degrees. The test was repeated ten times, and the number of punctures per ten impacts was recorded. As apparent from the test results, it was confirmed that the cut resistance of the example tires were superior to the reference tires.

As described above, the pneumatic tire according to the present invention achieved only an increase in cut resistance of the sidewall portion but also a decrease in the total sidewall portion thickness. Therefore, the tire improves running performance and with reduced weight and, at the same time, improves puncture resistance for running safety. The present invention is suitably applied to passenger car tires.

TABLE 1

| Rubber composition | (parts by weight) | | | |
| --- | --- | --- | --- | --- |
|  | A | B | C | D |
| NR | 15 | 45 | 45 | 40 |
| BR | 55 | 55 | 55 | 60 |

TABLE 1-continued

| Rubber composition | (parts by weight) | | | |
|---|---|---|---|---|
| | A | B | C | D |
| Carbon black (FEF) | 35 | 35 | 35 | 50 |
| Fibrous reinforcements | 45 | 0 | 0 | 0 |
| FRR *1) | Fiber 15 + NR 30 | | | |
| Aromatic polyamide fiber | '0 | 15 | 0 | 0 |
| Cotton fiber | 0 | 0 | 15 | 0 |
| Oil | 5 | | | |
| Age resistor | 2 | | | |
| Stearic acid | 2 | | | |
| Zinc oxide | 3 | | | |
| Sulfur | 1.5 | | | |
| Accelerator | 1.0 | | | |

*) name of an Ube Kosan's product: a prepared material in which nylon short fibers and natural rubber are mixed at the ratio of 1:2

TABLE 2

| | Ex. 1 | Ex. 2 | Ex. 3 | Ex. 4 | Ex. 5 | Ref. 1 | Ref. 2 | Ref. 3 |
|---|---|---|---|---|---|---|---|---|
| Protective rubber layer | | | | | | non | | |
| Rubber composition (Table 1) | A | B | C | A | B | — | D | D |
| Complex elastic modulus E* (kgf/sq · cm) | 103 | 330 | 235 | 103 | 330 | — | 40 | 40 |
| Length (mm) | 35 | 35 | 35 | 35 | 35 | — | 35 | 35 |
| Thickness (mm) | 2.5 | 2.5 | 2.5 | 2.5 | 2.5 | — | 2.5 | 2.5 |
| Sidewall rubber layer Thickness *2) (mm) | 3.5 | 3.5 | 3.5 | 3.0 | 3.0 | 3.5 | 7 | 3.5 |
| Edge stone test No. of punctures | 0 | 0 | 0 | 0 | 0 | 8 | 1 | 3 |

*2) thickness measured at the maximum width point (M)

We claim:

1. A pneumatic tire comprising:
   a tread portion with a pair of edges;
   a pair of axially spaced bead portions each with a bead core;
   a pair of sidewall portions extending from the edges of the tread portion to the bead portions;
   a carcass extending between the bead portions;
   said tread portion having a tread rubber layer disposed radially outside the carcass;
   each of said sidewall portions including a sidewall rubber layer disposed axially outside the carcass, the sidewall rubber layer being of softer material than the tread rubber layer;
   a protective rubber layer disposed on the outer surface of each of the sidewall rubber layers defining a portion of the outer surface of each sidewall portion;
   the protective rubber layer having a radial outer edge that ends near the edge of the tread rubber layer and a radial inner edge located radially inward of the maximum carcass width point of the tire and within the sidewall portion;
   the protective rubber layer being made of a fiber-reinforced rubber composition containing 10 to 50 parts by weight of short fibrous reinforcements, 20 to 70 parts by weight of carbon black, and 100 parts by weight of rubber base consisting of 20 to 100 parts by weight of natural rubber or isoprene rubber and 80 to 0 parts by weight of butadiene rubber; the short fibrous reinforcements oriented at an angle in the range of between 0 to 20 degrees with respect to the tire circumferential direction.

2. The pneumatic tire according to claim 1, wherein the mean length of the short fibrous reinforcements is in the range of between 20 microns to 2.0 mm, and the mean diameter of the short fibrous reinforcements is in the range of between 1 micron to 0.1 mm.

3. The pneumatic tire according to claim 1, wherein the protective rubber layer has a complex elastic modulus of 50 to 450 kgf/sq.cm in the tire circumferential direction under a strain amplitude of 2%, a frequency of 10 Hz, and a temperature of 70 degrees Centigrade.

4. The pneumatic tire according to claim 1, wherein the width of each of said protective rubber layers is in the range of between 2 mm to 20 mm.

5. The pneumatic tire according to claim 1, wherein the radial outer edge of each of the protective rubber layers is affixed to one of the sidewall rubber layers at a distance in the range of between 5 mm to 15 mm from the tread rubber layer.

6. The pneumatic tire according to claim 1, wherein the mean length of the short fibrous reinforcements is in the range of between 20 microns to 2.0 mm.

7. The pneumatic tire according to claim 1, wherein the mean diameter of the short fibrous reinforcements is in the range of between 1 micron to 0.1 mm.

8. The pneumatic tire according to claim 1, wherein the aspect ratio of the short fibrous reinforcements is greater than 10.

9. The pneumatic tire according to claim 1, wherein each of said sidewall rubber layers has a recessed portion for receiving said protective rubber layer.

* * * * *